United States Patent
Li et al.

(10) Patent No.: US 9,107,087 B2
(45) Date of Patent: Aug. 11, 2015

(54) METHOD AND DEVICE FOR DETERMINING CHANNEL QUALITY INDICATION INFORMATION

(75) Inventors: Ruyue Li, Shenzhen (CN); Yijian Chen, Shenzhen (CN); Jun Xu, Shenzhen (CN); Senbao Guo, Shenzhen (CN); Bo Dai, Shenzhen (CN); Yunfeng Sun, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 168 days.

(21) Appl. No.: 13/979,381

(22) PCT Filed: Jan. 12, 2012

(86) PCT No.: PCT/CN2012/070292
§ 371 (c)(1),
(2), (4) Date: Jul. 12, 2013

(87) PCT Pub. No.: WO2012/095015
PCT Pub. Date: Jul. 19, 2012

(65) Prior Publication Data
US 2013/0286884 A1    Oct. 31, 2013

(30) Foreign Application Priority Data
Jan. 12, 2011   (CN) .......................... 2011 1 0023494

(51) Int. Cl.
*H04L 1/00*    (2006.01)
*H04W 24/00*   (2009.01)
(Continued)

(52) U.S. Cl.
CPC ............. *H04W 24/00* (2013.01); *H04L 1/0026* (2013.01); *H04L 5/0057* (2013.01); *H04L 25/0224* (2013.01); *H04L 27/18* (2013.01); *H04L 27/34* (2013.01)

(58) Field of Classification Search
USPC ......... 370/252, 329, 328, 331, 310, 312, 466; 375/219, 267, 224
See application file for complete search history.

(56) References Cited

U.S. PATENT DOCUMENTS

| | | | |
|---|---|---|---|
| 2010/0183086 A1* | 7/2010 | Ko et al. ....................... | 375/260 |
| 2010/0254471 A1 | 10/2010 | Ko et al. | |
| 2011/0141987 A1* | 6/2011 | Nam et al. .................... | 370/329 |

FOREIGN PATENT DOCUMENTS

| | | |
|---|---|---|
| CN | 101277166 A | 10/2008 |
| CN | 101841847 A | 9/2010 |

(Continued)

OTHER PUBLICATIONS

TSG RAN WG4 meeting #57, Verification of the enhanced downlink MIMO, Nokia, Jacksonville, Nov. 2010.
(Continued)

*Primary Examiner* — Chi H Pham
*Assistant Examiner* — Alexander O Boakye
(74) *Attorney, Agent, or Firm* — Oppedahl Patent Law Firm LLC (57) ABSTRACT

The disclosure provides a method and device for determining Channel quality indication information, which is configured to perform channel measurement based on a reference signal, so as to obtain a CQI information. The method considers the influence of multiple factors on CQI calculation, including selection of a measurement reference signal as well as the influence of multiple complex conditions on CQI calculation, thereby solving the problem that an existing system is unable to obtain accurate Channel quality indication information when using a transmission mode 9, and enhancing the flexibility and performance of the system.

15 Claims, 1 Drawing Sheet

(51) Int. Cl.
    *H04L 5/00*     (2006.01)
    *H04L 25/02*     (2006.01)
    *H04L 27/18*     (2006.01)
    *H04L 27/34*     (2006.01)

(56) References Cited

FOREIGN PATENT DOCUMENTS

| JP | 2014504073 A | 2/2014 |
|---|---|---|
| WO | 2012072028 A1 | 6/2012 |

OTHER PUBLICATIONS

3GPP TS 36.213 V10.1.0, 3rd Generation Partnership Project; Technical Specification Group Radio Access Network, Evolved Universal Terrestrial Radio Access (E-UTRA), Physical layer procedure (Release 10), Mar. 2011.

3GPP TSG RAN WG1 #59bis, Discussion on CSI-RS based CQI Reporting for Rel-10, Samsung, Valencia, Spain, Jan. 18, 2010.
3GPP TSG-RAN WG1#63, On non-PMI based feedback in Rel-10, CMCC, CATT, Jacksonville, USA, Nov. 15, 2010.
3GPP TSG RAN WG1 Meeting #63bis, Remaining Issues of CSI Feedback, ZTE, Dublin, Ireland, Jan. 17, 2011.
3GPP TSG RAN WG1 Meeting #63bis, Views on Supporting PMI Disabling in TM9, Research in Motion, Dublin, Ireland, Jan. 17, 2011.
3GPP TSG-RAN Meeting #64, Corrections to Rel-10 LTE-Advanced features in 36.213, Motorola, Taipei, Taiwan, Feb. 21, 2011.
International Search Report in international application No. PCT/CN2012/070292, mailed on Apr. 19, 2012.
English Translation of the Written Opinion of the International Search Authority in international application No. PCT/CN2012/070292, mailed on Apr. 19, 2012.
3GPP TS 36.213 V10.0.1; Dec. 2010.
3GPP TS 36.213 V10.4.0; Dec. 2011.

* cited by examiner

METHOD AND DEVICE FOR DETERMINING CHANNEL QUALITY INDICATION INFORMATION

TECHNICAL FIELD

The disclosure relates to the field of wireless communications, and in particular to a method and device for determining Channels Quality Indication (CQI) information.

BACKGROUND

In wireless communication technologies, when a base station such as an Evolved Node B (eNodeB, eNB) sends data using multiple antennas, a spatial multiplexing scheme can be adopted to enhance the data transmission rate, namely, different data are transmitted at different antenna locations using the same time-frequency resource at a sending end, and likewise, a receiving end such as a User Equipment (UE) receives data by using multiple antennas. In the case of a single user, the resources of all antennas are allocated to the same user, this user occupies exclusively a physical resource allocated to an base station side in a transmission interval, this way of transmission is called Single User Multiple-Input Multiple-Out-put (SU-MIMO); In the case of multiple users, a spatial resource of different antennas is allocated to different users, one user shares the physical resource allocated by the base station side with at least one other user in the transmission interval, wherein the way of sharing may be a Space Division Multiple Access scheme or a Space Division Multiplexing scheme, and this way of transmission is called Multiple User Multiple-Input Multiple-Out-put (MU-MIMO). Wherein, the physical resource allocated by the base station side refers to the time-frequency resource, The eNB needs to provide the data in those two modes to the UE if a transmission system is to simultaneously support both SU-MIMO and MU-MIMO. Both in the SU-MIMO mode and the MU-MIMO mode, the UE needs to know the Rank used by the eNB for transmitting MIMO data to the UE, in the SU-MIMO mode, the resources of all antennas are allocated to the same user, the number of layers used for transmitting the MIMO data just equals to the Rank used by the eNB for transmitting the MIMO data; In the MU-MIMO mode, the number of layers used for transmission to one user is less than the total layer number used by the eNB for transmitting the MIMO data; If a handover between the SU-MIMO and the MU-MIMO modes is to be performed, the eNB needs to inform the UE of different control data in different transmission modes.

In a Long Term Evolution (LTE) system, the control signallings to be transmitted on uplink includes an Acknowledgement/Negative Acknowledgement (ACK/NACK) message and three forms reflecting downlink physical Channel State Information (CSI): CQI, Pre-coding Matrix Indicator (PMI), and Rank Indicator (RI).

The CQI is an indicator for judging whether the quality of a downlink channel is good or bad. In a 36-213 protocol, the CQI is represented by an integer value from 0 to 15, which represents different CQI levels respectively, wherein different CQI corresponds to respective Modulation and Coding Scheme (MCS) as shown in Table 1. The selection of the CQI level should conform to the following rule:

The selected CQI level should make the Block Error Rate of a PDSCH (Physical Downlink Shared Channel) transmission block corresponding to the CQI not exceed 0.1 in corresponding MCS.

Based on a non-restrictive detecting interval in a frequency domain and a time domain, the UE will obtain the highest CQI value corresponding to each maximum CQI value reported in an uplink subframe n; the range of a CQI index is from 1 to 15 and satisfies the following condition (the CQI index is 0 if the CQI index 1 does not satisfy this condition): when a single PDSCH transmission block is being received, the Error Rate does not exceed 0.1. The PDSCH transmission block contains a joint information: a modulation scheme and a transmission block size corresponding to one CQI index and an occupied set of downlink physical resource blocks, i.e., CQI reference resources. Wherein, the highest CQI value refers to the maximum CQI value when the block error rate (BLER) is guaranteed to be no greater than 0.1, which helps to control resource allocation. Generally speaking, the smaller the CQI value, the more the resources occupied, and the better the BLER performance.

The combination of the transmission block size and the modulation scheme corresponds to a CQI index, which specifically includes the following conditions:

1. According to a relevant transmission block size table, the combined information for performing PDSCH transmission on the CQI reference resource may be informed by using a signalling.

2. The CQI index may indicate the modulation scheme

3. The effective channel code rate generated by the combined information containing the transmission block size and the modulation scheme applied in the reference resources is the most accessible effective channel code rate that can be characterized by the CQI index. When there are more than one combined information exists and the combined information may all generate equally accessible effective channel code rates characterized by the CQI index, then the combined information with a minimum transmission block size is adopted.

Each CQI index corresponds to a modulation scheme and a transmission block size; the transmission block size has a definite corresponding relationship with the number of Physical resource blocks (NPRB), and the code rate may be calculated according to the transmission block size and the size of NPRB.

TABLE 1

4 bit CQI table

| CQI index | modulation | code rate × 1024 | efficiency |
|---|---|---|---|
| 0 | out of range | | |
| 1 | QPSK (Quadrature Phase Shift Keying) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM (Quadrature Amplitude Modulation) | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI appeared in the LTE has various definitions, and the CQI may be classified according to different principles:

1. According to a measuring bandwidth, it is classified into wideband CQI and subband CQI:

The wideband CQI refers to a channel state indication for all subbands, which leads to a CQI information of set S of subbands;

The subband CQI refers to the CQI information for each subband. The LTE divides the Resource Blocks (RB) corresponding to an effective bandwidth into several RB groups according to different system bandwidths, each RB group is called a subband.

The subband CQI may be further classified into an all-subband CQI and a selecting M best subbands (Best M) CQI; The all-subband CQI reports the CQI information for all subbands; the best M CQI selects M subbands from the set S of subbands, reports the CQI information of these M subbands, and reports the location information of the M subbands simultaneously.

2. According to the number of code stream, it is classified into single stream CQI and double stream CQI:

The single stream CQI is applied to Closed-loop spatial multiplexing of RI=1, single antenna transmitting port 0, port 5, Transmit diversity, and MU-MIMO, in which case the UE reports the CQI information of a single code stream;

The double stream CQI is applied to a Closed-loop spatial multiplexing mode. To an Open-loop spatial multiplexing mode, as a channel state information is unknown, and equalization processing is performed on double stream characteristics in preceding. therefore the CQIs of 2 code streams are equal under Open-loop spatial multiplexing.

3. According to a CQI representing method, it is classified into absolute value CQI and Differential CQI:

The absolute value CQI is the CQI index represented with 4 bits in Table 1;

The Differential CQI is a CQI index represented with 2 bits or 3 bits; The Differential CQI is further classified into the Differential CQI of a second code stream relative to a first code stream, the Differential CQI of a subband CQI relative to a subband CQI.

4. According to a CQI reporting scheme, it is classified into wideband CQI, UE selected (subband CQI), and High layer configured (subband CQI)

The wideband CQI refers to the CQI information of the set S of subbands;

The UE selected (subband CQI) is the Best M CQI feeding back the CQI information of the selected M subbands and reporting locations of the M subbands simultaneously;

The High layer configured (subband CQI) is the all-subband CQI that feeds back one CQI information for each subband.

Both the High layer configured and the UE selected are feedback schemes of the subband CQI, under a non-periodic feedback mode, subband sizes defined by these two feedback schemes are not the same; Under the UE selected mode, the size of the M is further defined.

In a LTE system, ACK/NACK is transmitted with a format 1/1a/1b (PUCCH format1/1a/1b) on a Physical Uplink Control Channel (PUCCH), and on a Physical Uplink Shared Channel (PUSCH) if the UE needs to transmit uplink data; the feedback of CQI/PMI and RI may be a periodic feedback or may be a non-periodic feedback Specific feedbacks are as shown in Table 2:

TABLE 2

Uplink physical channel corresponding to a periodic feedback and a non-periodic feedback

| scheduling mode | periodic CQI report channel | non-periodic CQI report channel |
|---|---|---|
| frequency non-selectivity | PUCCH | |
| frequency selectivity | PUCCH | PUSCH |

Wherein, to the CQI/PMI and RI which are periodically fed back, if the UE does not need to transmit uplink data, then the CQI/PMI and RI which are periodically fed back are transmitted with the format 2/2a/2b (PUCCH format2/2a/2b) on the PUCCH: If the UE needs to transmit uplink data, then the CQI/PMI and RI are transmitted on the PUSCH; the CQI/PMI and RI which are non-periodically fed back are transmitted only on the PUSCH.

The following three kinds of downlink physical control channels are defined in an LTE Release 8 standard: Physical Control Format indicator Channel (PCFICH), Physical Hybrid Automatic Retransmission Request Indicator Channel (PHICH), and Physical Downlink Control Channel (PDCCH). Wherein, the PDCCH is configured to bear Downlink Control Information (DCI) including uplink and downlink scheduling information, and uplink power control information. A DCI format is classified into: DCI format 0, DCI format 1 DCI format 1A, DCI format 18, DCI format 1C, DCI format 1D, DCI format 2, DCI format 2A, DCI format 3, DCI format 3A and the like; Wherein a transmission mode 5 supporting the MU-MIMO utilizes the Downlink Control Information of DCI format 1D, and a Downlink power offset field $\square_{power\text{-}effect}$ in DCI format 1D is configured to indicate the information for halving (i.e., −10 log 10 (2)) the power to a user in the MU-MIMO mode, as the MU-MIMO transmission mode 5 only supports the MU-MIMO transmission of two users; and through this Downlink power offset field, the MU-MIMO transmission mode 5 may support the dynamic handover between the SU-MIMO mode and the MU-MIMO mode. However, no matter in the SU-MIMO mode or the MU-MIMO mode, this DCI format only supports the transmission of one stream for one UE; although LTE Release 8 supports a single-user transmission of at most two streams in transmission mode 4, since the handover between transmission modes can only be done semi-statically, therefore the dynamic handover between a single-user multi-stream transmission and a multi-user transmission can not be achieved in LTE Release 8.

In LTE Release 9, in order to enhance downlink multi-antenna transmission, a double-stream Beamforming transmission mode, which is defined as transmission mode 9, is introduced, and a DCI format 2B is added to the Downlink Control Information to support the transmission mode. There is an identifier bit for scrambling identity (SCID) in the DCI format 2B which is to support two different scrambling sequences, an eNB may allocates the two scrambling sequences to different users so as to multiplex multiple users at the same resource. Moreover, when only one transmission block is Enabled, a new data indicator (ND) bit corresponding to a Disabled transmission block is also used for indicating an antenna port in the case of single layer transmission.

Moreover, in an LTE Release 10, in order to further enhance downlink multi-antenna transmission, a new Closed-loop spatial multiplexing transmission mode, which is defined as a transmission mode 10, is added, this transmission mode can support SU-MIMO and MU-MIMO as well as the dynamic handover thereof. Moreover, this transmission mode also supports 8-antenna transmission. This new transmission mode has determined to use a Demodulation Reference Signal (DMRS) as a pilot frequency for demodulation, and the UE needs to acquire the location of the pilot frequency before making channel and interference estimation on the pilot frequency.

In Release R10, the UE is semi-statically configured, through a high level signalling, to receive PDSCH data transmission in accordance with the indication of the PDCCH of an UE-Specific search space based on one of the following transmission modes:

Mode 1: Single-antenna port; port 0;
Mode 2: Transmit diversity;
Mode 3: Open-loop spatial multiplexing;
Mode 4: Closed-loop spatial multiplexing;
Mode 5: Multi-user MIMO;
Mode 6: Closed-loop Rank=1 precoding;
Mode 7: Single-antenna port; port 5;
Mode 8: double-stream transmission, i.e., double-stream beam shaping;
Mode 9: spatial multiplexing of at most 8 layers.

In Release R10, transmission mode 9 and a Channel-State Information-Reference Symbol (CSI-RS) are newly added. Transmission mode 9 performs channel measurement based on the CSI-RS, so as to calculate and obtain CQI. Other transmission modes perform channel measurement based on a cell-specific reference signal (CRS), so as to calculate CQI. In Release R10, some CSI-RS parameters are also added correspondingly for characterizing attribute. Compared with the CRS in R8, some parameters are similar. some parameters are newly added. For example, there is a similar CRS port number in R8, while a CSI-RS subframe configuration period parameter is newly added, The following parameters are cell-specific and are configured by a high level signalling for the definition of CSI-RS, including:

a CSI-RS port number, a CSI-RS configuration, a CSI-RS subframe configuration parameter (ICSI-RS), a subframe configuration period (TCSI-RS), a subframe deviator, and an assumed Pc of an UE applied to a CSI feedback with reference to a PDSCH transmitting power.

In R10, to the transmission mode 9, as the new concept of "double-codebook" or "double-PMI" is introduced, therefore two PMIs needed to be fed back; to 8 antennas, a first PMI indicates the channel state information of a wideband, a second PMI indicates the channel state information of a subband, and the complete precoding matrix information can only be obtained when both PMIs are obtained, wherein the subband includes the case of the wideband, i.e., the wideband is taken as one special case of the subband, for example the second PMI also may be of wideband; to 2 antennas and 4 antennas, the first PMI indicates a unit matrix, and the second PMI is equivalent to the PMI of the original R8 protocol.

To the new transmission mode 9 of the R10 protocol, lack of consideration to CSI-RS and PRS when determining and calculating CQI will cause transmission mode 9 cannot accurately use the CRS or CSI-RS to achieve channel measurement, and thereby cannot obtain accurate channel quality information in the case of transmission mode 9, which will seriously reduce the flexibility and performance indicator of the system.

SUMMARY

The technical solution to be solved by the disclosure is to provide a method and device for determining Channel quality indication information, so as to solve the problem that an existing system is unable to obtain accurate Channel quality indication information when using transmission mode 9, thereby enhancing the flexibility and performance of the system.

To achieve the purpose above the technical solution of the disclosure implemented as follows:

A method for determining Channel Quality Indication (CQI) information, including:

transmitting, by an eNodeB, a Channel-State Information-Reference Symbol (CSI-RS) and a cell-specific reference signal (CRS) to a User Equipment (UE);

performing, by the UE, channel measurement according to the CSI-RS or CRS;

determining, by the UE, a CQI reference resource, and determining, by the UE, a CQI value on the CQI reference resource according to the result of the channel measurement, wherein, if the UE is configured without a Pre-coding Matrix Indicator (PMI)/Rank Indicator (RI) by the eNodeB, the UE calculates the CQI based on the CRS; if the UE is configured with the PMI/RI by the eNodeB, the UE calculates the CQI based on the CSI-RS;

wherein, on a frequency domain, the CQI reference resource is defined by a downlink physical resource block corresponding to a frequency band to which the CQI value related; on a time domain, the CQI reference resource is defined by a downlink subframe; on a transmission layer domain, the CQI reference resource is defined by any RI and PMI on which the CQI is conditioned.

Wherein, when determining the CQI value, it may be assumed that the CSI-RS does not use any resource element of the CQI reference resource.

Wherein, when determining the CQI value, it may be assumed that a positing reference signal (PRS) does not use any resource element of the CQI reference resource.

To the CQI reference resource, when there is a configurable measuring subset which is for CSI measurement and is formed by a channel quality information measuring subframe, then the channel measurement or interference measurement may be limited to a subframe defined by the measuring subset; the base station may configure said measuring subset through a signalling or a non-periodic triggering; on the time domain, the downlink subframe of the CQI reference resource may needs to be defined in said measuring subset.

Wherein, to a transmission mode 9, when the UE is configured without the PMI/RI by the eNodeB, the UE may be arranged with N virtual CSI-RS ports, in which case it may be assumed that a transmission strategy for a downlink data sharing channel of the CQI reference resource is an N-antenna transmit diversity, wherein the N is a natural number determined by the number of the CRS or CSI-RS ports.

Wherein, to a transmission mode 9, when the UE is configured without the PMI/RI by the eNodeB and the number of the CSI-RS ports of the eNodeB is 8, the UE may be arranged with 2 virtual CSI-RS ports, in which case it may be assumed that a transmission strategy for a downlink data sharing channel of the CQI reference resource is a 2-antenna transmit diversity.

Wherein, to a transmission mode 9, when the UE is configured without the PMI/RI by the eNodeB and the number of the CSI-RS ports of the eNodeB is 8, the UE may be arranged with 4 virtual CSI-RS ports, in which case it may be assumed that a transmission strategy for a downlink data sharing channel of the CQI reference resource is a 4-antenna transmit diversity.

Wherein, to a transmission mode 9, when the UE is configured without the PMI/RI by the eNodeB and the number of the CSI-RS ports of the eNodeB is 8, the UE may be arranged with 1 virtual CSI-RS port, in which case it may be assumed that a transmission strategy for a downlink data sharing channel of the CQI reference resource is single layer transmission.

Wherein, the CSI-RS ports from 15 to 18 may be mapped to a first virtual CSI-RS port, and the CSI-RS ports from 19 to 22 may be mapped to a second virtual CSI-RS port.

Wherein, the CSI-RS ports 15, 17, 19, and 21 may be mapped to a first virtual CSI-RS port, and the CSI-RS ports 16, 18, 20, and 22 may be mapped to a second virtual CSI-RS port.

Wherein, the CSI-RS ports 15 and 16 may be mapped to a first virtual CSI-RS port. the CSI-RS ports 17 and 18 may be mapped to a second virtual CSI-RS port, the CSI-RS ports 19 and 20 may be mapped to a third virtual CSI-RS port, the CSI-RS ports 21 and 22 may be mapped to a fourth virtual CSI-RS port.

Wherein, the CSI-RS ports 15 and 19 may be mapped to a first virtual CSI-RS port, the CSI-RS ports 16 and 20 may be mapped to a second virtual CSI-RS port, the CSI-RS ports 17 and 21 may be mapped to a third virtual CSI-RS port, the CSI-RS ports 18 and 22 may be mapped to a fourth virtual CSI-RS port.

Wherein, to a transmission mode 9, when the number of the CSI-RS ports configured by the eNodeB is 1, the UE may calculate the CQI based on the CRS; when the number of the CSI-RS ports configured by the eNodeB is greater than 1 the UE may calculate the CQI based on the CSI-RS.

A device for determining Channel Quality Indication (CQI) information, including:

a receiving module, which is configured to receive a Channel-State Information-Reference Symbol (CSI-RS) and/or a cell-specific reference signal (CRS) transmitted by a base station (eNodeB);

a measuring module, which is configured to perform channel measurement according to the CSI-RS and/or CRS received by the receiving module, wherein if the UE is configured without a Pre-coding Matrix Indicator (PMI)/Rank Indicator (RI) by the eNodeB, the channel measurement is performed based on the CRS, if the UE is configured with the PMI/RI by the eNodeB, the channel measurement is performed based on the CSI-RS;

a determining module, which is configured to determine a CQI reference resource and the condition for calculating the CQI; and a calculating module, which is configured to calculate a CQI value corresponding to the CSI reference resource according to the condition determined by the determining module and a measurement result of the measuring module, wherein on a frequency domain, the CQI reference resource is defined by a downlink physical resource block corresponding to a frequency band to which a source CQI value related; on a time domain, the CQI reference resource is defined by a downlink subframe; on a transmission layer domain, the CQI reference resource is defined by any RI and PMI on which the CQI is conditioned.

Wherein, when calculating the condition of the CQI, the determining module may be configured to assume that the CSI-RS does not use any resource element of the CQI reference resource.

Wherein, when calculating the condition of the CQI, the determining module may be configured to assume that a positing reference signal (PRS) does not use any resource element of the CQI reference resources.

Wherein, the device lay be arranged in User Equipment (UE).

The disclosure does not increase any system complexity or signalling cost, but determines whether the current feedback mode is with PMI/RI feedback through a configured high level signalling CSI-RS port number, and supports the two forms of with and without PMI/RI feedback, thereby making up for the defect in the prior art, so as to support the aforementioned two feedback schemes. In addition, the type of a measurement reference signal is selected through an existing PMI-RI high level configure signalling or CSI-RS port number, such that one transmission mode may support the channel measurement of two kinds of reference signals, and an assumption of a unified PDSCH transmission scheme is defined, solving the problem that the UE is unable to obtain accurate channel quality information in the prior art. Meanwhile, good compatibility and smaller cost are maintained since a CSI-RS parameter in R10 and a PMI-RI high level parameter in R9 are effectively used.

DETAILED DESCRIPTION

To make the purpose, technical solution, and advantage of the disclosure more clear, the disclosure is further described below in details with reference to the figures.

Firstly, a CQI reference resource is illustrated on the three aspects of time domain, frequency domain, and transmission domain.

On the frequency domain, the CQI reference resource indicates that a CQI is obtained by measuring on certain segment of bandwidth;

On the time domain, the CQI reference resource indicates that a CQI is obtained by measuring on certain downlink subframe, wherein the downlink subframe is invalid under certain circumstances. When the downlink subframe where a CQI reference resource is located is invalid, no CQI is reported in an uplink subframe on subframe n; Specifically, When CQI is fed back periodically, the number of CQI_refs of the downlink subframe n thereof is at least 4. That is, the CQI is obtained by measuring before at least 4 downlink subframes;

In the case of non-periodic feedback, the CQI is obtained by measuring on the downlink subframe triggered by DCI format 0;

In the case of non-periodic feedback, the CQI is obtained by measuring at the subframe following the subframe triggered by Random Access Response Grant;

On the transmission domain, a CQI is obtained by calculating a PMI and RI.

When a CQI is calculated utilizing a CQI reference resource, the following necessary condition are further required:

In a CQI reference resource, in order to calculate a CQI index, an UE needs to make the following assumptions:

A control signal occupies the first 3 OFDM (Orthogonal Frequency Division Multiple Access) symbols;

A primary/secondary synchronizing signal or a Physical Broadcast Channel (PBCH) does not use resource element;

The length of CP takes the length of CP of a non-Multicast/Broadcast Single Frequency Network (MBSFN) subframe;

A redundant version takes redundant version 0 (RV0);

An Assumed PDSCH transmission scheme is given according to the transmission. mode currently configured for the UE;

If channel measurement is performed according to a CSI-RS, the ratio of an Energy Per Resource Element (EPRE) between a PDSCH and CSI-RS needs to be given;

If channel measurement is performed according to a CRS, the ratio of the EPRE between a PDSCH and CRS needs to be given;

When determining Channel quality indication information, the following steps may be executed:

An eNodeB transmits a CSI-RS and CRS to an UE;

The UE performs the channel measurement according to the CSI-RS or CRS;

The UE determines a CQI reference resource, and determines a CQI value on the CQI reference resource according to a result of the channel measurement.

Wherein, on the frequency domain, the CQI reference resource is defined by a set of downlink physical resource blocks corresponding to a frequency band to which a source CQI value related; on the time domain, the CQI reference resource is defined by a downlink subframe; and on a transmission layer domain, the CQI reference resource is defined by any RI and PMI on which the CQI is conditioned.

When determining a CQI value, it needs to be assumed that the CSI-RS does not use the resource element of a CQI reference resource.

When determining a CQI value, it needs to be assumed that a positing reference signal (PRS) does not use the resource element of a CQI reference resource;

To the CQI reference resource, if there is a configurable measuring subset which is for CSI measurement and is formed by a channel quality information measuring subframe, then the channel measurement or interference measurement is limited to a subframe defined by the measuring subset. A base station may configure said measuring subset through a high level signalling or a non-periodic triggering. On the time domain, the downlink subframe of the CQI reference resource needs to be defined in said measuring subset.

Note that, if the high level is configured with a PMI-RI-Report parameter, then an eNodeB is configured with a PMI/RI report, otherwise the UE is configured without a PMI/RI report by the eNodeB.

To the transmission mode 9, when the UE is configured without the PMI/RI by the eNodeB and the number of the CSI-RS ports of the eNodeB is 8, the eNodeB may be arranged with 2 virtual CSI-RS ports, in which case it is assumed that a transmission strategy for a downlink data sharing channel of the CQI reference resource is a 2-antenna transmit diversity.

The 2 virtual CSI-RS ports include: CSI-RS ports from 1 to 4 are mapped to a first virtual CSI-RS port, CSI-RS ports from 5 to 8 are mapped to a second virtual CSI-RS port.

The 2 virtual CSI-RS ports include: CSI-RS ports 15, 17, 19, and 21 are mapped to the first virtual CSI-RS port, CSI-RS ports 16, 18, 20, and 22 are mapped to the second virtual CSI-RS port.

To the transmission mode 9, when the UE is configured without the PMI/RI and the number of the CSI-RS ports of the eNodeB is 8, the eNodeB may be arranged with 4 virtual CSI-RS ports, in which case it is assumed that a transmission strategy for a downlink data sharing channel of the CQI reference resource is a 4-antenna transmit diversity.

To the 4 virtual CSI-RS ports, CSI-RS ports 15 and 16 are mapped to the first virtual CSI-RS port. CSI-RS ports 17 and 18 are mapped to the second virtual CSI-RS port, CSI-RS ports 19 and 20 are mapped to the third virtual CSI-RS port, CSI-RS ports 21 and 22 are mapped to the fourth virtual CSI-RS port.

To the 4 virtual CSI-RS ports, CSI-RS ports 15 and 19 are mapped to the first virtual CSI-RS port, CSI-RS ports 16 and 20 are mapped to the second virtual CSI-RS port, CSI-RS ports 17 and 21 are mapped to the third virtual CSI-RS port, CSI-RS ports 18 and 22 are mapped to the fourth virtual CSI-RS port.

To the transmission mode 9, when the UE is configured without the PMI/RI by the eNodeB and the number of the CSI-RS ports of the eNodeB is 8, the eNodeB may be arranged with 1 virtual CSI-RS port, in which case it is assumed that a transmission strategy for a downlink data sharing channel of the CQI reference resource is single layer transmission.

The 1 virtual CSI-RS port is that, CSI-RS ports 15 and 22 are mapped to one virtual CSI-RS port.

To the transmission mode 9, the UE calculates the CQI based on the CRS if the UE is configured without the PMI/RI by the eNodeB; the UE calculates the CQI based on the CSI-RS if the UE is configured with the by the eNodeB.

To the transmission mode 9, when the number of the CSI-RS ports configured by the eNodeB is 1, the UE calculates the CQI based on the CRS; When the number of the CSI-RS ports configured by the eNodeB is greater than 1, the UE calculates the CQI based on the CSI-RS.

Embodiment 1

Assuming that a base station configures transmission mode 9 for certain UE, the base station configures, for the UE, 8 CSI-RS ports with CSI-RS port numbers from 15 to 22.

Figure 1:
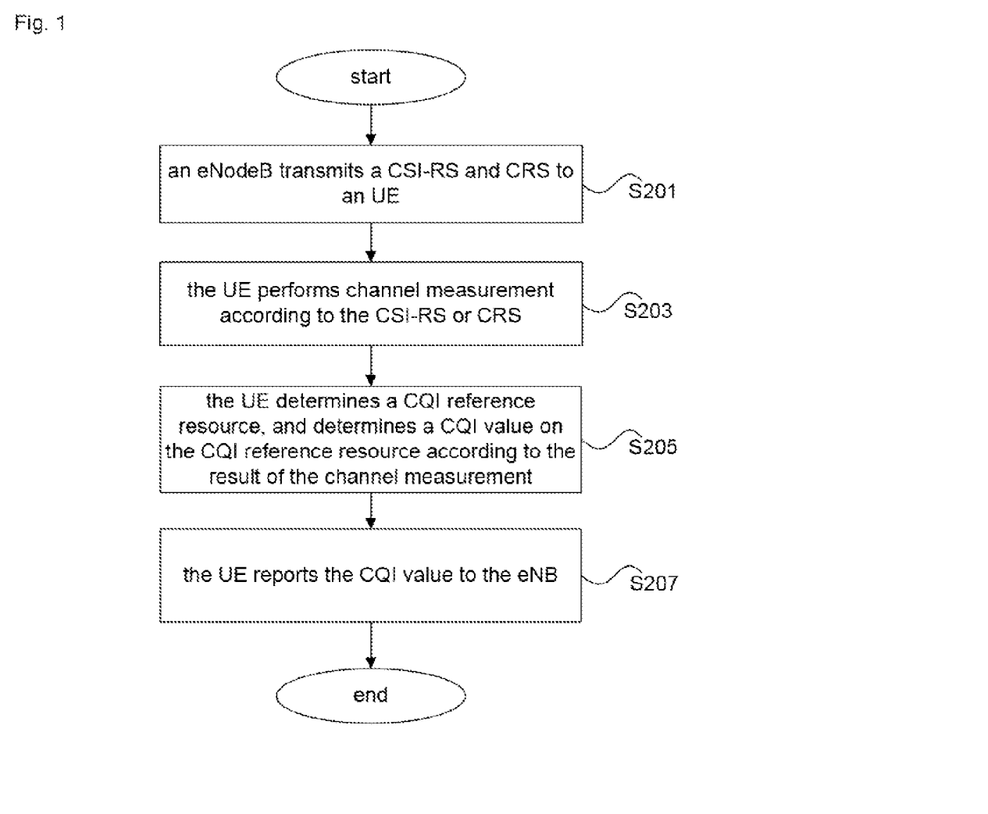
FIG. 1 is the flowchart for determining Channel quality indication information in an embodiment of the disclosure.

When determining a Channel quality indication information, as shown in FIG. 1, the following steps may be executed:

S201: an eNodeB transmits a CSI-RS and CRS to the UE;

S203: the UE performs channel measurement according to the CSI-RS or CRS;

S205: the UE determines a CQI reference resource, and determines the CQI value on the CQI reference resource according to the result of the channel measurement;

S207: the UE reports the CQI value to the eNB.

When determining the CQI value, it needs to be assumed that the CSI-RS does not use the resource element of the CQI reference resource. In this case, there are two possibilities:

the first possibility is that there is a resource element used by the CSI-RS in the CQI reference resource; When calculating the CQI, it needs to be assumed that these resource elements used by the CSI-RS are not occupied by the CSI-RS but occupied by data.

The second possibility is that there is no CSI-RS resource element in the CQI reference resource, naturally no such assumption exists.

When determining the CQI value, it needs to be assumed that a PRS does not use the resource element of the CQI reference resource. There are two possibilities as well:

The first possibility is that there is a resource element used by the PRS in the CQI reference resource; When calculating the CQI, it needs to be assumed that these resource elements used by the CSI-RS are not occupied by the PRS but occupied by data.

The second possibility is that there is no PRS resource element in the CQI reference resource, naturally no such assumption exists.

In short, the aforementioned CQI calculating method takes the influence of the CSI-RS and PRS on the CQI into full consideration, guaranteeing the accuracy of the CQI demodulating data. Specifically, the CQI calculation is based on the simplest scenario, i.e., the influence of the CSI-RS and PRS on the reported CQI is excluded as much as possible; When scheduling, a base station may perform proper adjustment on the MCS of data according to whether the current subframe includes the CSI-RS and PRS, so as to guarantee the performance and effect of system link adaptation.

Embodiment 2

Assuming that the base station configures transmission mode 9 for certain UE, the base station configures, for the UE, 8 CSI-RS ports with CSI-RS port numbers from 15 to 22.

When determining a Channel quality indication information, the following steps may be executed:

an eNodeB transmits a CSI-RS and CRS to the UE;

the UE performs channel measurement according to the CSI-RS or CRS; and the UE determines a CQI reference resource, and determines the CQI value on the CQI reference resource according to the result of the channel measurement.

To the transmission mode 9, when the UE is configured without the PMI/RI by the eNodeB and the number of the CSI-RS ports of the eNodeB is 8, the eNodeB may be arranged with 2 virtual CSI-RS ports, in which case it is assumed that a transmission strategy for a downlink data sharing channel of the CQI reference resource is a 2-antenna transmit diversity.

The 2 virtual CSI-RS ports include: CSI-RS ports from 15 to 18 are mapped to a first virtual CSI-RS port, CSI-RS ports from 19 to 22 are mapped to a second virtual CSI-RS port.

Specifically, CSI-RS ports from 15 to 18 transmit the same signal, CSI-RS ports from 19 to 22 transmit the same signal.

Another possibility is that, said 2 virtual CSI-RS ports include: CSI-RS ports 15, 17, 19, and 21 are mapped to a first virtual CSI-RS port, CSI-RS ports 16, 18, 20, and 22 are mapped to a second virtual CSI-RS port.

Specifically, CSI-RS ports 15, 17, 19, and 21 transmit the same signal, CSI-RS ports 16, 18, 20, and 22 transmit the same signal.

Embodiment 3

Assuming that a base station configures transmission mode 9 for certain UE, the base station configures, for the UE, 8 CSI-RS ports with CSI-RS port numbers from 15 to 22.

When determining a Channel quality indication information, the following steps may be executed:

an eNodeB transmits a CSI-RS and CRS to the UE;

the UE performs channel measurement according to the CSI-RS or CRS; and the UE determines a CQI reference resource, and determines the CQI value on the CQI reference resource according to the result of the channel measurement.

To the transmission mode 9, when the UE is configured without the PMI/RI by the eNodeB and the number of the CSI-RS ports of the eNodeB is 8, the UE is arranged with 4 virtual CSI-RS ports, in which case it is assumed that a transmission strategy for a downlink data sharing channel of the CQI reference resource is a 4-antenna transmit diversity.

To the 4 virtual CSI-RS ports, CSI-RS ports 15 and 16 are mapped to the first virtual CSI-RS port, CSI-RS ports 17 and 18 are mapped to the second virtual CSI-RS port, CSI-RS ports 19 and 20 are mapped to the third virtual CSI-RS port, CSI-RS ports 21 and 22 are mapped to the fourth virtual CSI-RS port.

Specifically, CSI-RS ports 15 and 16 transmit the same signal, CSI-RS ports 17 and 18 transmit the same signal, CSI-RS ports 19 and 20 transmit the same signal, CSI-RS ports 21 and 22 transmit the same signal.

Or, to the 4 virtual CSI-RS ports, CSI-RS ports 15 and 19 are mapped to the first virtual CSI-RS port, CSI-RS ports 16 and 20 are mapped to the second virtual CSI-RS port, CSI-RS ports 17 and 21 are mapped to the third virtual CSI-RS port, CSI-RS ports 18 and 22 are mapped to the fourth virtual CSI-RS port.

Specifically. CSI-RS ports 15 and 19 transmit the same signal, CSI-RS ports 16 and 20 transmit the same signal, CSI-RS ports 17 and 21 transmit the same signal, CSI-RS ports 18 and 22 transmit the same signal.

Embodiment 4

Assuming that a base station configures transmission mode 9 for certain UE, the base station configures, for the UE, 8 CSI-RS ports with CSI-RS port numbers from 15 to 22.

When determining a Channel quality indication information, the following steps may be executed:

an eNodeB transmits a CSI-RS and CRS to the UE;

the UE performs channel measurement according to the CSI-RS or CRS; and the UE determines a CQI reference resource, and determines the CQI value on the CQI reference resource according to the result of the channel measurement.

To the transmission mode 9, when the UE is configured without the PMI/RI by the eNodeB and the number of the CSI-RS ports of the eNodeB is 8, the eNodeB may be arranged with 1 virtual CSI-RS port, in which case it is assumed that a transmission strategy for a downlink data sharing channel of the CQI reference resource is single layer transmission.

Furthermore, to said 1 virtual CSI-RS port, CSI-RS ports 15 and 22 are mapped to one virtual CSI-RS port.

Embodiment 5

When determining a Channel quality indication information, the following steps may be executed:

an eNodeB transmits a CSI-RS and CRS to an UE;

the UE performs channel measurement according to the CSI-RS or CRS; and the UE determines a CQI reference resource, and determines the CQI value on the CQI reference resource according to the result of the channel measurement.

To the transmission mode 9, when the UE is configured without the PMI/RI by the eNodeB, the UE is arranged with N virtual ports, in which case it is assumed that a transmission strategy for a downlink data sharing channel of the CQI reference resource is an N-antenna transmit diversity, wherein the N is a natural number determined by the number of the CRS or CSI-RS ports, and the N may be 1, 2, or 4.

Embodiment 6

When determining a Channel quality indication information, the following steps may be executed:

an eNodeB transmits a CSI-RS and CRS to an UE;

the UE performs channel measurement according to the CSI-RS or CRS; and the UE determines a CQI reference resource, and determines the CQI value on the CQI reference resource according to the result of the channel measurement.

Wherein, on the frequency domain, the CQI reference resource is defined by a set of downlink physical resource blocks corresponding to a frequency band to which a source CQI value related; on the time domain, the CQI reference resource is defined by a downlink subframe; and on a transmission layer domain, the CQI reference resource is defined by any RI and PMI on which the CQI is conditioned.

To the CQI reference resource, when there is a configurable measuring subset which is for CSI measurement and is formed by a channel quality information measuring subframe, then the channel measurement or interference measurement is limited to a subframe defined by the measuring subset. A base station may configure said measuring subset through a high level signalling or a non-periodic triggering. On the time domain, the downlink subframe of the CQI reference resource needs to be defined in said measuring subset.

Embodiment 7

Figure 2:
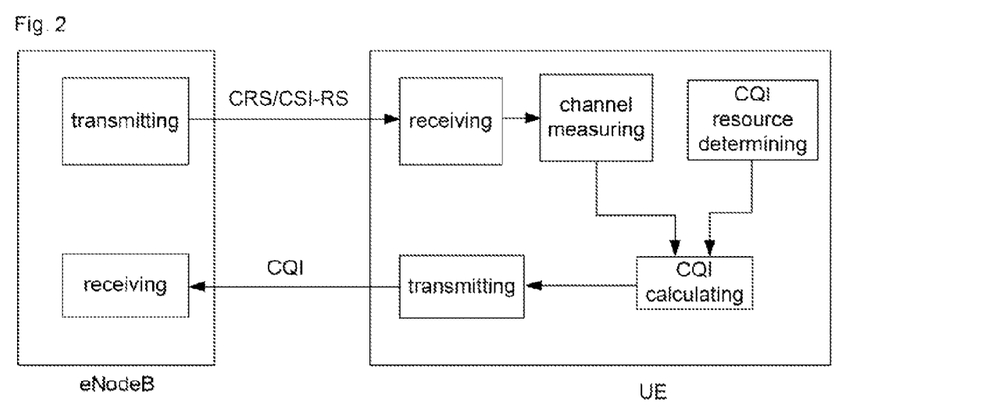
FIG. 2 is the schematic diagram of a system of an embodiment of the disclosure.

The embodiment provides a device for determining CQI information that may be arranged in an UE; The system containing the UE and an eNodeB is as shown in FIG. 2. Wherein, the eNodeB includes a sending module and a receiving module, wherein the sending module is configured to transmit a CSI-RS and/or CRS to a terminal; and the receiving module is configured to receive a CQI transmitted by the terminal;

the UE includes a receiving module, a measuring module, a determining module, a calculating module, and a sending module, wherein the receiving module is configured to receive a CSI-RS and/or CRS transmitted by a base station;

the measuring module is configured to perform channel measurement according to the CSI-RS and/or CRS received by the receiving module, wherein if the UE is configured without a PMI/RI by the eNodeB, then the channel measurement is performed based on the CRS, if the UE is configured with the PMI/RI by the eNodeB, the channel measurement is performed based on the CSI-RS;

the determining module is configured to determine a CSI reference resource and the condition for calculating the CQI; and the calculating module is configured to calculate a CQI value corresponding to the CSI reference resource according to the condition determined by the determining module and a measurement result of the measuring module.

When calculating the condition of the CQI by the determining module, it may be assumed that the CSI-RS does not use the resource element of the CQI reference resource.

When calculating the condition of the CQI by the determining module, it may also be assumed that a PRS does not use the resource element of the CQI reference resource.

Thus, it can be seen that, an UE may perform channel measurement according to a CSI-RS or CRS, determine a CQI reference resource, and determine the CQI value on the CQI reference resource according to the result of channel measurement.

What described are merely preferred embodiments of the disclosure and are not intended to limit the scope of the disclosure.

The invention claimed is:

1. A method for determining Channel Quality Indication (CQI) information, comprising:
    transmitting, by a base station (eNodeB), a Channel-State Information-Reference Symbol (CSI-RS) and cell-specific reference signal (CRS) to a terminal (User Equipment (UE));
    performing, by the UE, channel measurement according to the CSI-RS or CRS;
    determining, by the UE, a CQI reference resource, and determining, by the UE, the CQI value on the CQI reference resource according to the result of the channel measurement;
    on a frequency domain, defining the CQI reference resource by a downlink physical resource block corresponding to a frequency band to which the CQI value related; on a time domain, defining the CQI reference resource by a downlink subframe; on a transmission layer domain, defining the CQI reference resource by any Rank Indicator (RI) and Pre-coding Matrix Indicator (PMI) on which the CQI is conditioned, characterized by the step of:
    calculating the CQI, by the UE, by using the CRS as an measuring reference signal if the UE is configured without the PMI/RI by the eNodeB; calculating the CQI, by the UE, by using the CSI-RS as an measuring reference signal if the UE is configured with the PMI/RI by the eNodeB; or
    to the CQI reference resource, when there is a configurable measuring subset which is for CSI measurement and is formed by a channel quality information measuring subframe, then the channel measurement or interference measurement is limited to a subframe defined by the measuring subset; configuring said measuring subset by the base station through a signalling or a non-periodic triggering; on the time domain, the downlink subframe of the CQI reference resource needs to be defined in said measuring subset.

2. The method according to claim 1, wherein when determining the CQI value, assuming that the CSI-RS does not use any resource element of the CQI reference resource.

3. The method according to claim 1, wherein when determining the CQI value, assuming that a positing reference signal (PRS) does not use any resource element of the CQI reference resource.

4. The method according to claim 1, wherein to a transmission mode 9, when the UE is configured without the PMI/RI by the eNodeB, the UE is arranged with N virtual CSI-RS ports, in which case it is assumed that a transmission strategy for a downlink data sharing channel of the CQI reference resource is an N-antenna transmit diversity, wherein the N is a natural number determined by the number of the CRS or CSI-RS ports.

5. The method according to claim 1, wherein to a transmission mode 9, when the UE is configured without the PMI/RI by the eNodeB and the number of the CSI-RS ports of the eNodeB is 8, the UE is arranged with 2 virtual CSI-RS ports, in which case it is assumed that a transmission strategy for a downlink data sharing channel of the CQI reference resource is a 2-antenna transmit diversity.

6. The method according to claim 5, wherein the CSI-RS ports from 15 to 18 are mapped to a first virtual CSI-RS port, and the CSI-RS ports from 19 to 22 are mapped to a second virtual CSI-RS port.

7. The method according to claim 5, wherein the CSI-RS ports 15, 17, 19, and 21 are mapped to a first virtual CSI-RS port, and the CSI-RS ports 16, 18, 20, and 22 are mapped to a second virtual CSI-RS port.

8. The method according to claim 1, wherein to a transmission mode 9, when the UE is configured without the PMI/RI by the eNodeB and the number of the CSI-RS ports of the eNodeB is 8, the UE is arranged with 4 virtual CSI-RS ports, in which case it is assumed that a transmission strategy for a downlink data sharing channel of the CQI reference resource is a 4-antenna transmit diversity.

9. The method according to claim 8, wherein the CSI-RS ports 15 and 16 are mapped to a first virtual CSI-RS port, the CSI-RS ports 17 and 18 are mapped to a second virtual CSI-RS port, the CSI-RS ports 19 and 20 are mapped to a third virtual CSI-RS port, the CSI-RS ports 21 and 22 are mapped to a fourth virtual CSI-RS port.

10. The method according to claim 8, wherein the CSI-RS ports 15 and 19 are mapped to a first virtual CSI-RS port, the CSI-RS ports 16 and 20 are mapped to a second virtual CSI-RS port, the CSI-RS ports 17 and 21 are mapped to a third virtual CSI-RS port, the CSI-RS ports 18 and 22 are mapped to a fourth virtual CSI-RS port.

11. The method according to claim 1, wherein to a transmission mode 9, when the UE is configured without the PMI/RI by the eNodeB and the number of the CSI-RS ports of the eNodeB is 8, the UE is arranged with 1 virtual CSI-RS port, in which case it is assumed that a transmission strategy for a downlink data sharing channel of the CQI reference resource is single layer transmission.

12. A device for determining Channel Quality Indication (CQI) information, comprising:

a receiving module, which is configured to receive a Channel-State Information-Reference Symbol (CSI-RS) and/or a cell-specific reference signal (CRS) transmitted by a base station (eNodeB);

a measuring module, which is configured to perform channel measurement according to the CSI-RS and/or CRS received by the receiving module;

a determining module, which is configured to determine a CQI reference resource and the condition for calculating the CQI; and a calculating module, which is configured to calculate a CQI value corresponding to the CSI reference resource according to the condition determined by the determining module and a measurement result of the measuring module, wherein on a frequency domain, the CQI reference resource is defined by a downlink physical resource block corresponding to a frequency band to which a source CQI value related; on a time domain, the CQI reference resource is defined by a downlink subframe; on a transmission layer domain, the CQI reference resource is defined by any Rank Indicator (RI) and Precoding Matrix Indicator (PMI) on which the CQI is conditioned, characterized by that:

if the UE is configured without the PMI/RI by the eNodeB, the channel measurement is performed by using the CRS as an measuring reference signal, if the UE is configured with the PMI/RI by the eNodeB, the channel measurement is performed by using the CSI-RS as an measuring reference signal; or to the CQI reference resource, when there is a configurable measuring subset which is for CSI measurement and is formed by a channel quality information measuring subframe, then the channel measurement or interference measurement is limited to a subframe defined by the measuring subset; configuring said measuring subset by the base station through a signalling or a non-periodic triggering; on the time domain, the downlink subframe of the CQI reference resource needs to be defined in said measuring subset.

13. The device according to claim 12, wherein when calculating the condition of the CQI, the determining module is configured to assume that the CSI-RS does not use any resource element of the CQI reference resource.

14. The device according to claim 12, wherein when calculating the condition of the CQI, the determining module is configured to assume that a positing reference signal (PRS) does not use any resource element of the CQI reference resource.

15. The device according to claim 12, wherein the device is arranged in a User Equipment (UE).

* * * * *